July 4, 1961

T. H. DE SPAIN 2,990,982

HOSIERY INSPECTION TURNING AND STACKING APPARATUS

Filed Feb. 24, 1955

INVENTOR
THOMAS H. DE SPAIN

BY Church & Church

ATTORNEYS

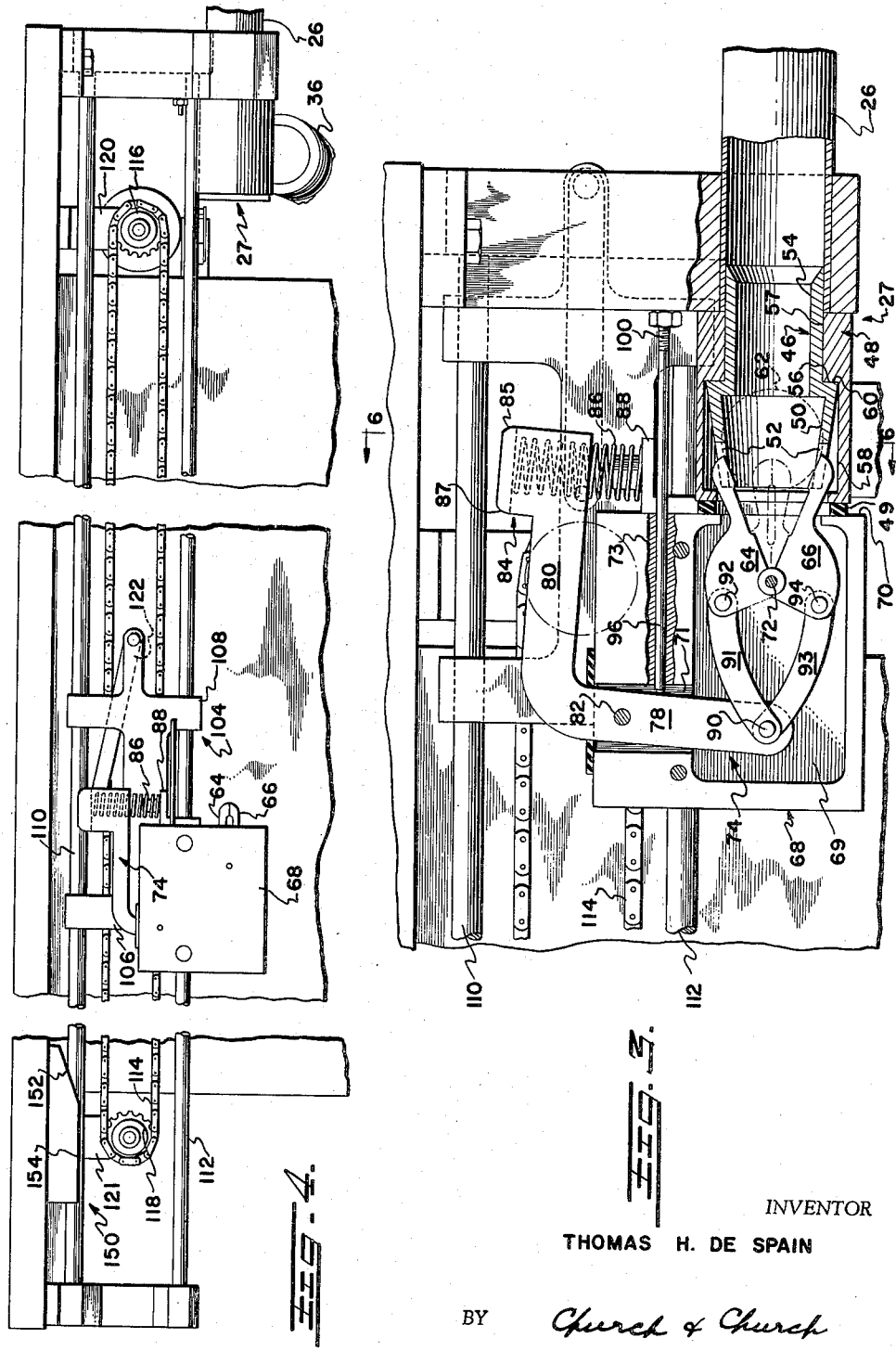

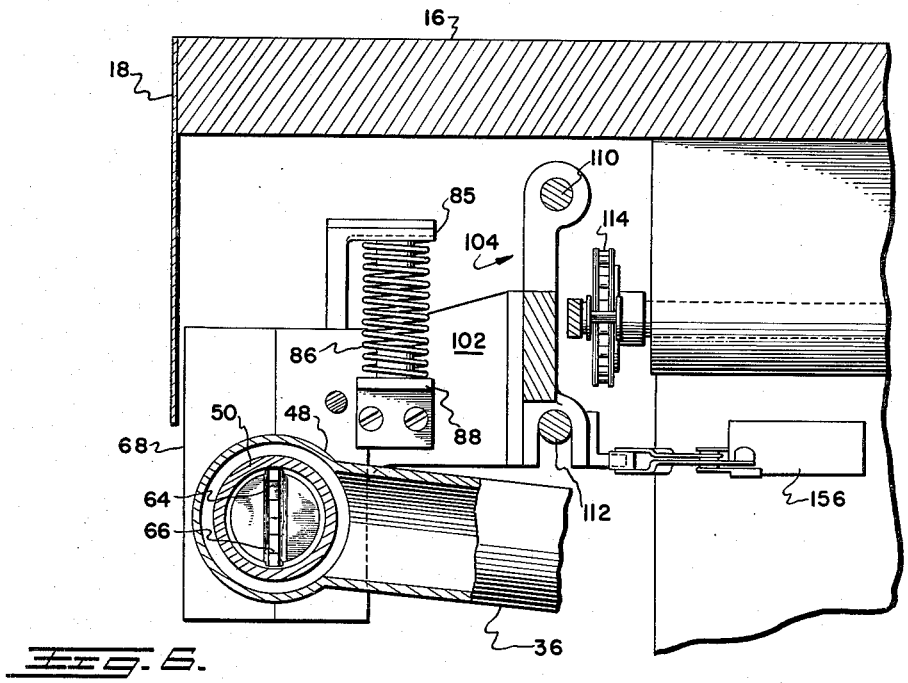
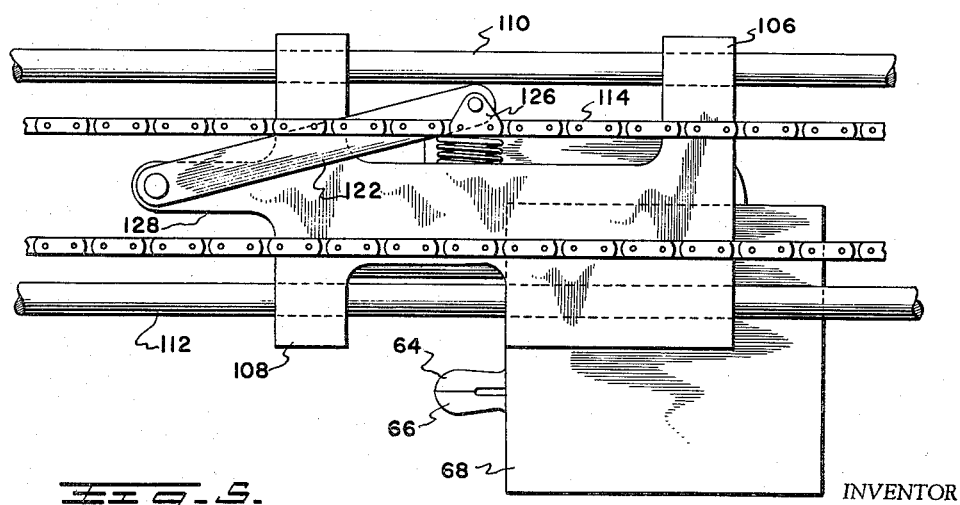

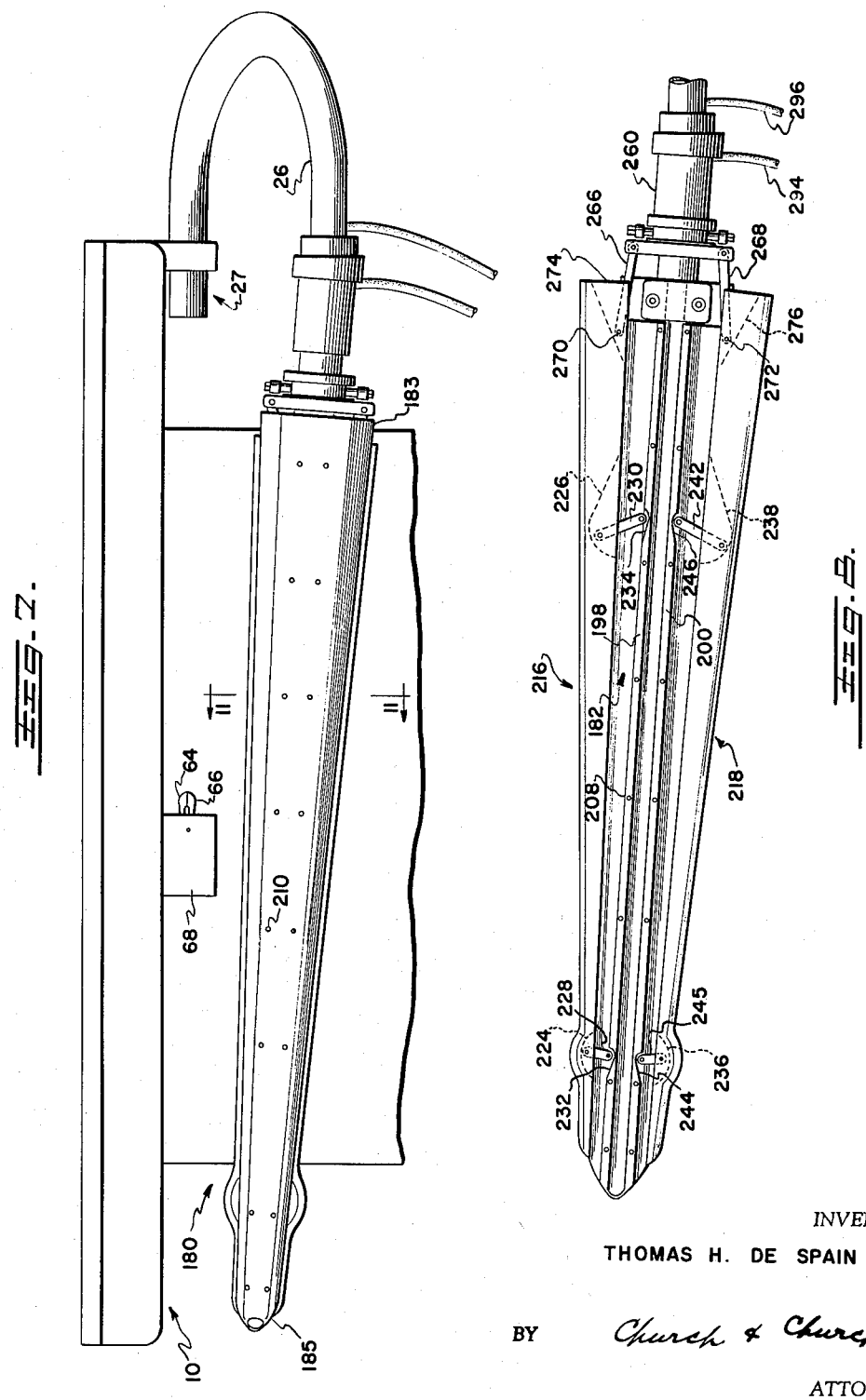

July 4, 1961 T. H. DE SPAIN 2,990,982
HOSIERY INSPECTION TURNING AND STACKING APPARATUS
Filed Feb. 24, 1955 7 Sheets-Sheet 5

INVENTOR
THOMAS H. DE SPAIN

BY Church & Church

ATTORNEYS

July 4, 1961  T. H. DE SPAIN  2,990,982
HOSIERY INSPECTION TURNING AND STACKING APPARATUS
Filed Feb. 24, 1955  7 Sheets-Sheet 6
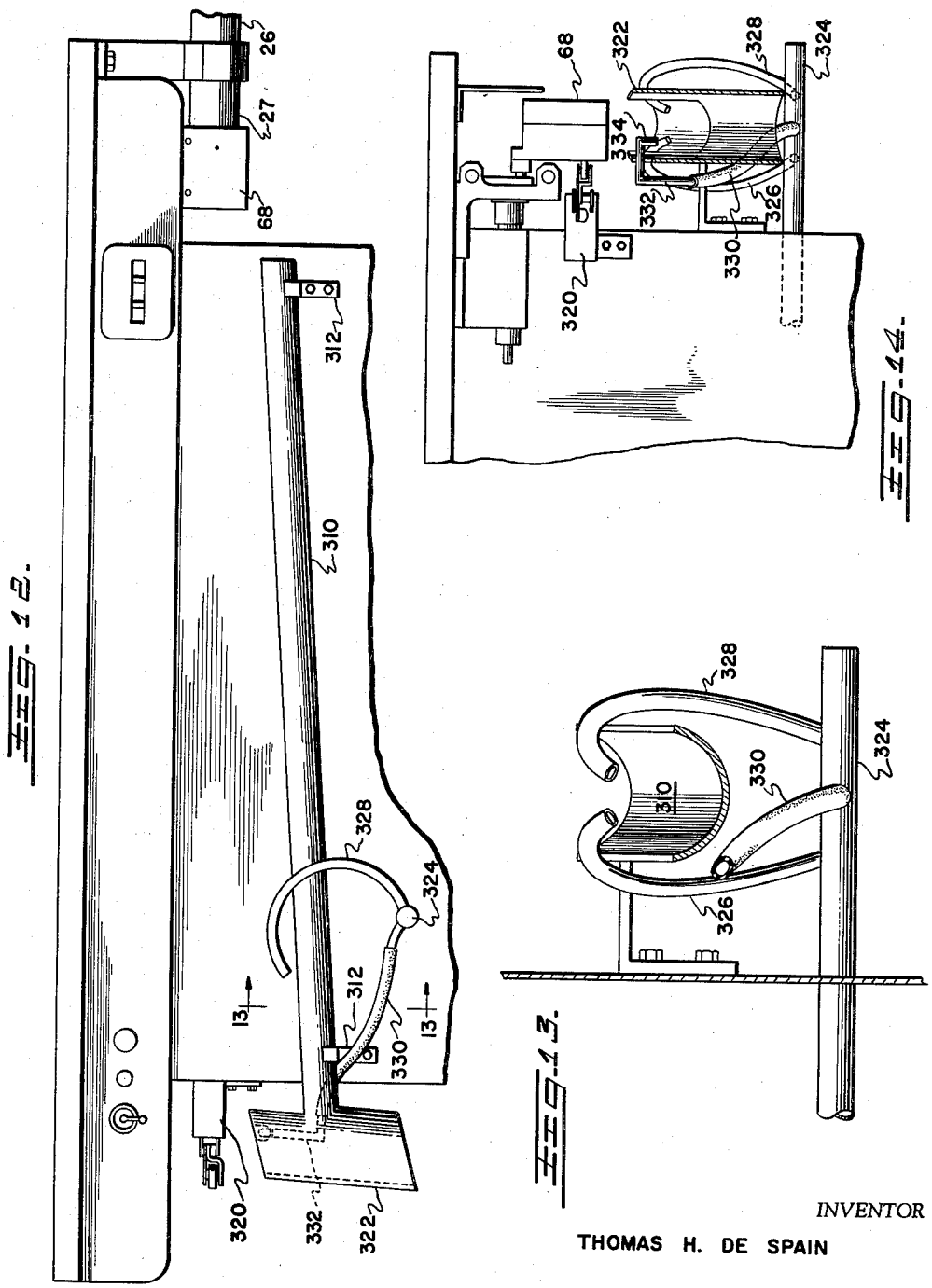
INVENTOR
THOMAS H. DE SPAIN
BY Church & Church
ATTORNEYS

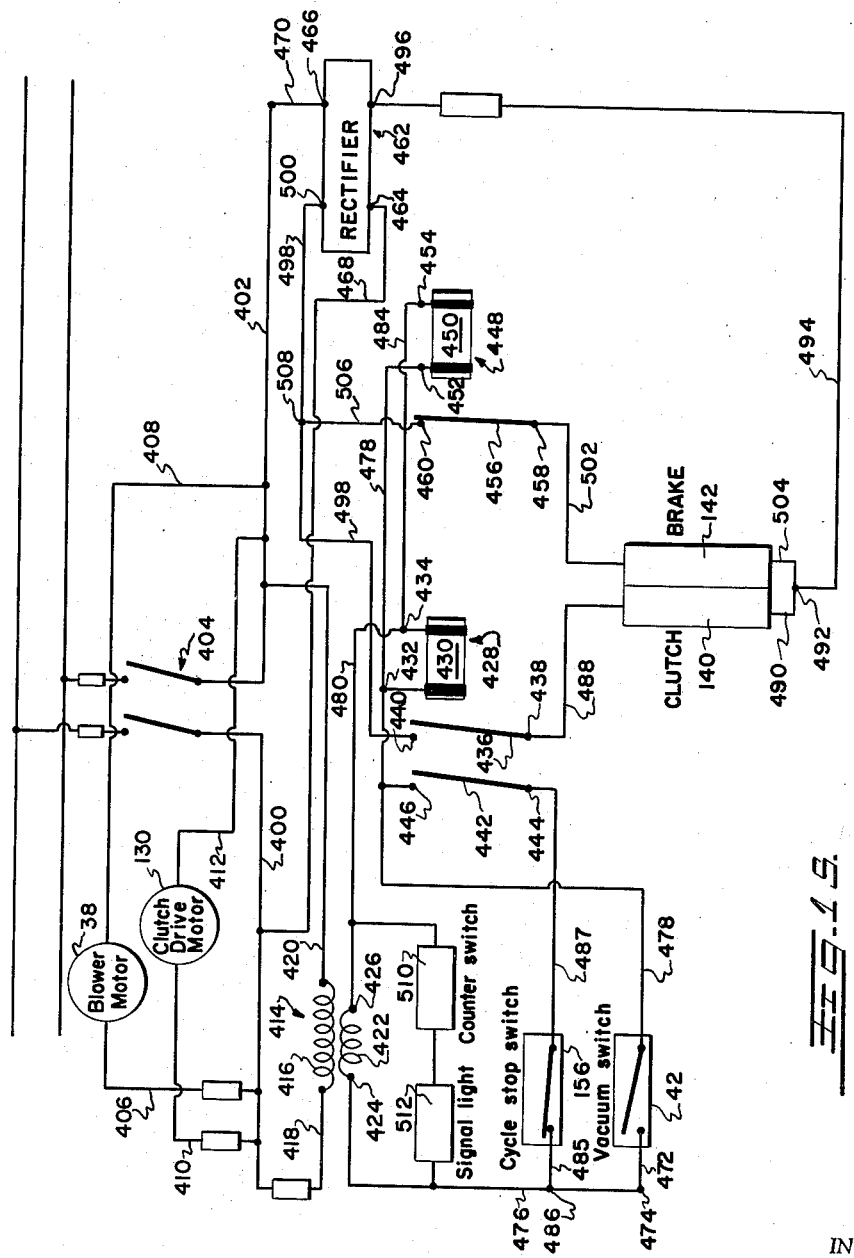

United States Patent Office 2,990,982
Patented July 4, 1961

2,990,982
HOSIERY INSPECTION TURNING AND
STACKING APPARATUS
Thomas H. De Spain, Paducah, Ky., assignor to Southern
Textile Machinery Co., Incorporated, Paducah, Ky., a
corporation of Kentucky
Filed Feb. 24, 1955, Ser. No. 490,310
11 Claims. (Cl. 223—43)

This invention relates to hosiery inspection apparatus and particularly concerns turning and stacking hosiery following an inspection operation. More particularly, this invention relates to a pneumatic hosiery inspection and turning apparatus having an improved hosiery stacking means.

In the manufacture of women's hosiery, it is the general practice to inspect the hosiery in inside-out position on the inspection form. Apparatus for turning and stacking hosiery following an inspection operation is disclosed in application Serial No. 209,574, of Edward R. Ammon, filed February 6, 1951, now Patent No. 2,722,348, issued November 1, 1955, and in my co-pending application Serial No. 368,625, filed July 17, 1953, now Patent No. 2,818,205 issued December 31, 1957. Both of these applications are assigned to the same assignee as the present application and disclose hosiery turning and stacking apparatus in which a pneumatic pressure differential is used to assist in turning and stacking the hosiery. The apparatus disclosed in both of these applications also includes cooperating mechanism for receiving the turned hosiery and stacking the turned hosiery along a path adjacent the apparatus.

While the apparatus disclosed in these prior applications automatically performs the hosiery turning and stacking functions in a very satisfactory manner, the apparatus of these applications is expensive to manufacture.

Accordingly, it is an object of this invention to provide a simple, reliable, and relatively inexpensive apparatus which automatically removes hosiery from an inspection form, turning the hosiery during the removal operation, and which deposits the hosiery in outstretched stacked relation in a predetermined position adjacent the inspection form.

It is a further object of this invention to provide a hosiery turning and stacking machine having an improved means for receiving the turned hosiery and for transferring the hosiery into stacked position along a path adjacent the apparatus.

It is a still further object of this invention to provide a hosiery turning and stacking apparatus having combined pneumatic and mechanical means for removing and turning hosiery from an inspection form and for transferring the turned hosiery into neatly stacked position along a path adjacent the inspection form.

It is another object of this invention to provide an expansible hosiery inspection form adapted for use with a pneumatic hosiery turning apparatus.

It is still another object of this invention to provide an improved bagging attachment for use with a hosiery stacking apparatus.

In achievement of these objectives, an embodiment of this invention provides a combined hosiery turning and stacking machine comprising a form on which the hosiery is positioned for inspection, the form being provided on its interior with a passage for receiving the hosiery after completion of the inspection step. The passage is open at one end for receiving the hosiery and is connected at its opposite end to a pneumatic pressure differential producing means. A reciprocably movable hosiery gripping means is positioned adjacent the outlet of the hosiery receiving passage which is connected to the pressure differential producing means. The hosiery gripping means includes a pair of relatively movable gripping jaw elements which are normally biased to closed position but which are actuated to an open hosiery receiving position when the gripping means is disposed adjacent the outlet of the hosiery receiving passage. A sensing means senses the arrival of hosiery at the traversing means and connects the reciprocably movable gripping means to a drive mechanism which causes the gripping means to move away from the outlet of the hosiery passage along a predetermined path. The hosiery gripping jaws are maintained in gripping relation to the toe of the hosiery during the forward movement of the traversing means and draw the hosiery along the path of movement thereby straightening the hosiery. After a predetermined movement of the gripping means has occurred, the hosiery is automatically released and drops in neatly stacked position onto a suitable receiver. The reciprocably movable gripping means completes its cycle of movement and returns to a position adjacent the outlet of the hosiery receiving passage in readiness for another cycle of operation.

The hosiery inspection form used with the apparatus may be of a type suitable for the inspection of either seamless hosiery or full-fashioned hosiery, the form in either case being provided with a hollow hosiery receiving passage connected to a source of pneumatic pressure differential.

The apparatus may also be provided with means for bagging the hosiery after it has been dropped by the stacking device into the hosiery receiving tray or receptacle. The bagging device includes pneumatic pressure differential assisting means which direct hosiery from a receiving trough in which it is dropped by the reciprocating gripping means into a bag or other container connected to the receiving trough.

As a further feature of the invention, an expansible inspection form is provided, having expander elements which are movable both laterally and longitudinally to assist an inspecting or removing the hosiery from the inspection form.

Further objects and advantages of the invention will become apparent from the following description taken in conjunction with the accompanying drawings in which:

FIG. 3 is an enlarged fragmentary view in vertical section showing the hosiery gripping means disposed at the outlet of the hosiery receiving passage in readiness to receive hosiery;

FIG. 4 is a fragmentary view in enlarged vertical elevation illustrating the traversing hosiery gripping means at a point adjacent the end of the forward traversing stroke;

FIG. 5 is an enlarged fragmentary view in vertical elevation of the hosiery gripping means at a point along its traversing path as viewed from the rear of the apparatus;

FIG. 6 is a view in transverse vertical section along line 6—6 of FIG. 3 showing details of the outlet end of the hosiery receiving passage, and of the engagement of the traversing mechanism with the cycle stop switch;

FIG. 7 is a view in fragmentary vertical elevation of a turning and stacking apparatus provided with an expansible inspection form in accordance with the invention;

FIG. 8 is an enlarged vertical elevation view of the expansible inspection form of FIG. 7 with one side plate removed;

FIG. 12 is a view in vertical elevation of a hosiery turning and stacking apparatus provided with a hosiery bagging attachment in accordance with a further feature of the invention;

FIG. 13 is a view in vertical section along line 13—13 of FIG. 12;

FIG. 14 is a fragmentary elevation view of the apparatus, viewed from the left-hand end of FIG. 12, with the vertical hosiery chute shown in section; and FIG. 15 is a diagram showing the electrical circuit connections of the hosiery turning and stacking apparatus.

Figure 1:
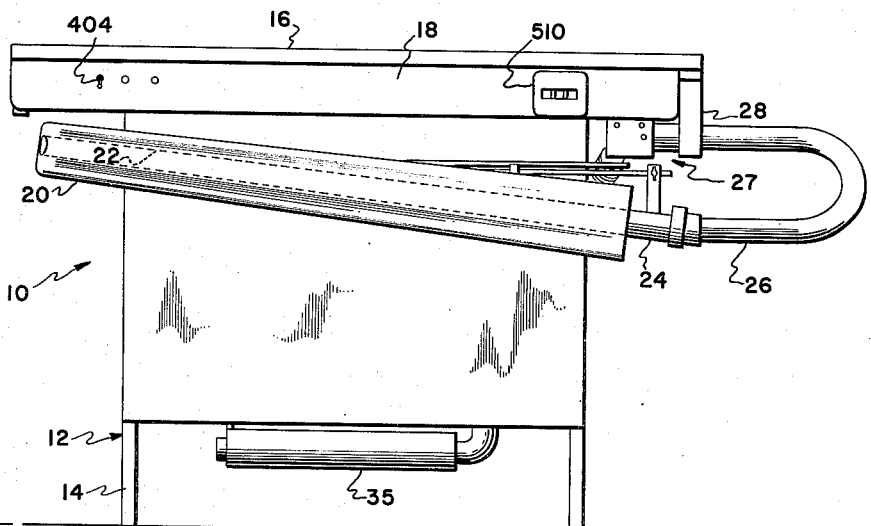
FIG. 1 is a front elevation view of an apparatus in accordance with the invention.

Referring now to the drawings, there is shown a hosiery inspecting, turning and stacking apparatus generally indicated at 10 supported upon a framework generally indicated at 12. Framework 12 is provided with vertical leg members 14 which support at their upper ends a horizontal top member 16. At the front of the apparatus, a panel member 18 extends vertically downwardly a short distance from top member 16. The apparatus includes a hosiery inspection form 20 which is rigidly supported by framework 12 at the front of the framework and intermediate the height thereof. Hosiery form 20 is provided on its interior with an axially extending hosiery receiving passage 22. Passage 22 is open at its left-hand end with respect to the view shown in FIG. 1 and is connected at its right-hand end to a stationary suction inlet duct 24 which communicates with the interior of hollow passage 22. The outer end of the inlet duct 24 is connected to a generally U-shaped fixed duct section 26 which is supported at its opposite end by a bracket 28 which forms a part of framework 12. Duct section 26 terminates in an outlet nozzle housing generally indicated at 27 which is continuously connected to a source of suction when the apparatus is in operation.

A source of suction comprising a positive displacement vacuum pump 30 is supported by a shelf 32 adjacent the lower end of framework 12 and at the rear of the apparatus. Pump 30 is provided with a stationary inlet duct 34 to which is connected a flexible conduit or duct 36. Duct 36 is connected at its upper or outer end to the nozzle housing 27 at the outlet end of U-shaped duct section 26 and thus is in constant communication with the interior of hollow hosiery receiving passage 22 of inspection form 20. Pump 30 is driven by a constantly operating motor 38 which is connected to the pump by means of a drive belt 40. The pump is provided with an outlet conduit 33 connected to a muffler 35. A vaccum switch generally indicated at 42 is supported by shelf 32 and is connected by a tube member 44 to inlet duct 34 of pump 30, thereby making vacuum switch 42 responsive to pneumatic pressure conditions in duct 34. Vacuum switch 42 is actuated by the presence of hosiery in nozzle housing 27 to initiate the cycle of traversing housing 68, as will be explained later.

As will best be seen in FIG. 3, nozzle housing 27 connected to the outlet end of duct 26 comprises a nozzle member generally indicated at 46 and an outer sleeve member generally indicated at 48. Nozzle 46 comprises a nozzle portion 50 tapered radially inwardly toward the outlet end of housing 27. Tapered nozzle portion 50 is provided with a pair of diametrically oppositely disposed slots 52 extending axially inwardly from the outer end of tapered portion 50 to receive a hosiery gripping means to be described in more detail hereinafter. Nozzle 46 also includes a shank portion 54 joined by a shoulder 56 to the end of tapered portion 50. Sleeve 48 is provided with an axially extending bore 57 aligned with and having substantially the same diameter as the bore of duct section 26. Sleeve 48 is also provided with a bore 58 of larger diameter which receives nozzle portion 50 of nozzle 46. A shoulder 60 is formed within sleeve 48 at the junction of bores 57 and 58. Nozzle 46 is positioned in sleeve 48 with shoulder 56 of nozzle 46 seated on shoulder 60 of sleeve 48, and with shank portion 54 of the nozzle extending through bore 57 of the sleeve. Shank 54 projects beyond the inner end of sleeve 48 and into the bore of U-shaped duct section 26.

Sleeve 48 is provided on its surface disposed toward the rear of the apparatus with an opening 62 to which the end of duct 36 is connected, thereby connecting vacuum pump 30 to the interior of sleeve 48, the suction being communicated to the interior of nozzle 46 through the forward opening of the nozzle and also through the slots 52 which receive the hosiery gripping elements.

The hosiery gripping elements include a pair of gripping jaws 64 and 66 which are supported by a traversing housing generally indicated at 68 having a forward end wall 70 which is adapted to engage the inwardly flanged forward end portion 49 of sleeve 48 in sealed engagement when traversing housing 68 is in the position shown in FIG. 3. Housing 68 is provided at its lower portion with a hollow chamber 69 in which hosiery gripping jaws 64 and 66 are pivotally mounted. A vertical passage 71 extends between the upper end of chamber 69 and the upper surface of housing 68. A horizontal passage 73 extends between vertical passage 71 and the forward wall 70 of the traversing housing 68. Gripping jaws 64 and 66 are pivotally movable about a pin member 72 which extends transversely across chamber 69 between the opposite side walls of traversing housing 68. The outer ends of jaws 64 and 66 project through suitable openings in end wall 70 of housing 68.

Gripping jaws 64 and 66 are operated to open or closed position with respect to the hosiery by means of a bell crank generally indicated at 74 which extends from chamber 69 upwardly through vertical passage 71. The bell crank includes a vertical leg 78 which extends upwardly through vertical passage 71 and a horizontal leg 80 which extends above the upper surface of housing 68. The bell crank is pivotally movable about a pin member 82 which extends through vertical leg 78 transversely of vertical passage 71. The width of passage 71 is such as to permit only a limited degree of pivotal movement of the bell crank. The outer end of horizontal leg 80 of the bell crank is provided with a vertical projection generally indicated at 84 having a laterally rearwardly projecting portion 85 which serves as a bearing surface for the upper end of biasing spring 86. The opposite or lower end of spring 86 is seated upon a bracket member 88 attached to the end wall 70 of the traversing housing. The forward end of projection 84 is provided with a rounded cam follower surface 87 for engagement with a hosiery releasing cam 150 located at the end of the forward traversing path of the hosiery gripping elements.

The lower end of vertical arm 78 of bell crank 74 is pivotally connected at 90 to links 91 and 93. The opposite ends of links 91 and 93 are pivotally connected to hosiery gripping jaws 64 and 66 at 92 and 94, respectively.

Spring 86 normally biases bell crank 74 in a counterclockwise direction with respect to the view shown in FIG. 3 whereby the hosiery gripping jaws 64 and 66 are moved into engagement with each other as shown in dotted outline in FIG. 3. A rod member 96 is slidably movable in horizontal passage 73, one end of rod 96 being movable into vertical passage 71. The opposite end of the rod extends forwardly of end wall 70 of housing 68 and is engageable with an adjustable stop member 100 supported by bracket 28 and in alignment with rod 96.

When traversing housing 68 is in the position shown in FIG. 3, rod 96 abuts against the end of stop member 100 and is thereby slidably moved into engagement with bell crank 74, causing the bell crank to pivot about its pivotal axis 82 to thereby move the hosiery gripping elements 64 and 66 to open position as shown in FIG. 3. As soon as the traversing housing 68 is moved forwardly by its operating mechanism, a sufficient distance to permit spring 86 to move bell crank 74 to its limiting position in a counterclockwise direction, as determined by the width of vertical passage 76, the hosiery gripping jaws 64 and 66 are moved to closed position again.

Traversing housing 68 is supported by a bracket member 102 (FIG. 6) which is connected to a slidably movable crosshead or carriage generally indicated at 104. Crosshead 104 is a generally H-shaped member in vertical elevation having a pair of spaced vertical legs 106 and 108. Each vertical leg 106 and 108 is provided at its upper and lower ends, respectively, with horizontally extending passages which receive upper and lower horizontal rod members 110 and 112 which are respectively supported at opposite ends of the upper portion of framework 12.

A drive chain 114 for imparting a reciprocatory traversing movement to crosshead 104 and thus to traversing housing 68 is mounted for rotation lengthwise of the upper end of the apparatus in a plane parallel to and adjacent rods 110 and 112. Chain 114 rotates about a pair of oppositely disposed sprocket members 116 and 118 (FIG. 4) which are suitably supported for rotation by brackets 120 and 121 attached to the top 16 of the supporting framework 12.

Reciprocating crosshead 104 is connected to drive chain 114 by means of a connecting link 122 which is pivotally connected at one of its ends to a link 126 of chain 114 and is pivotally connected at its opposite end to an extension arm 128 formed integrally with vertical leg 108 of crosshead 104. By pivotally connecting crosshead 104 to chain 114 by means of link 122 as just described, the rotary movement of chain 114 imparts a reciprocating forward and reverse movement to the crosshead and, consequently, to the traversing housing 68.

Drive chain 114 is driven from a continuously operating motor 130 which is connected through a drive belt 132 to the constantly driven input pulley member 136 of a clutch generally indicated at 134. Clutch 134 also includes an intermittently driven output pulley 138 to which input pulley 136 is connected in driving relation by an electrically operated clutch element 140. An electrically operated brake 142 is normally energized to prevent rotation of output pulley 138. Output pulley 138 is connected by a drive belt 144 to a pulley 146 on the same shaft as chain sprocket 116.

In order to move the hosiery gripping jaws 64 and 66 to open positon at the end of the forward traversing movement of housing 68 to thereby effect release of the hosiery by the gripping jaws, a cam member generally indicated at 150 (FIG. 4) is supported by framework 12 in the path of bell crank 74 at the end of the forward traversing movement. Cam 150 includes an inclined cam surface 152 and a lower horizontal surface 154. As the traversing housing 68 reaches the end of the forward traversing movement, the cam follower surface 87 of vertical projection 84 of bell crank 74 engages inclined surface 152 of the cam causing a clockwise movement of bell crank 74 about its pivotal axis 82 against the biasing force of spring 86, the upper surface of projection 84 finally moving underneath the horizontal surface 154 of the cam. The engagement of projection 84 with cam 150 causes gripping jaws 64 and 66 to assume their maximum degree of opening, similar to the view shown in FIG. 3. Opening gripping jaws 64 and 66 permits hosiery gripped by the jaws to drop in stacked relation to a receptacle or receiver disposed beneath the traversing path of the gripping jaws.

After release of the hosiery due to the opening of the gripping jaws, traversing housing 68 is carried by drive chain 114 backwardly along the same path until traversing housing 68 again engages the end of nozzle housing 27.

A cycle stop switch 156 (FIG. 6) is supported by the stationary framework at the end of the return path where it is contacted by the crosshead 104 to cause de-energization of the electrical clutch element 140 and energization of the electric brake 142. Drive chain 114 stops moving upon the de-energization of electric clutch element 140 and energization of electric brake 142. Traversing housing 68 remains in engagement with the end 49 of sleeve 48 of the nozzle housing as shown in FIG. 3. As traversing housing 68 moves into engagement with nozzle housing 27 at the end of the cycle, slidable rod 96 carried by traversing housing 68 engages abutment or stop member 100 and thereby causes a clockwise movement of bell crank 74 about its pivotal axis to the position shown in FIG. 3, thereby opening hosiery gripping jaws 64 and 66 in readiness for another cycle of operation.

*Expansible inspection form*

Figure 9:
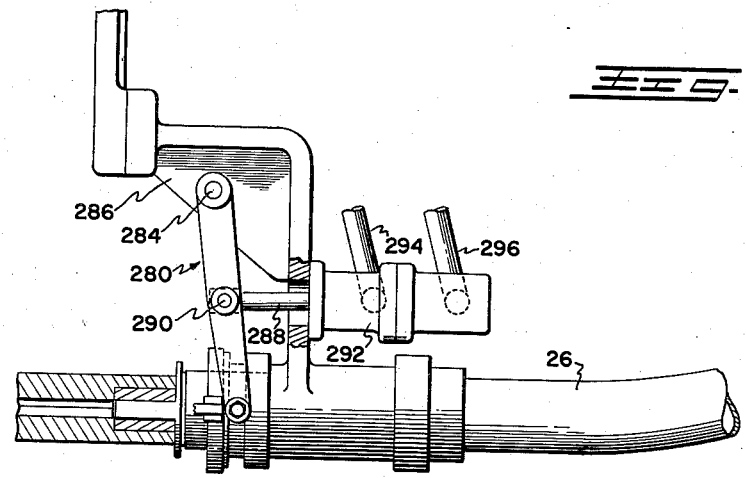
FIG. 9 is a fragmentary top plan view of the welt end portion of the expansible inspection form, showing the operating connection of the pneumatic cylinder which operates the form.
Figure 10:
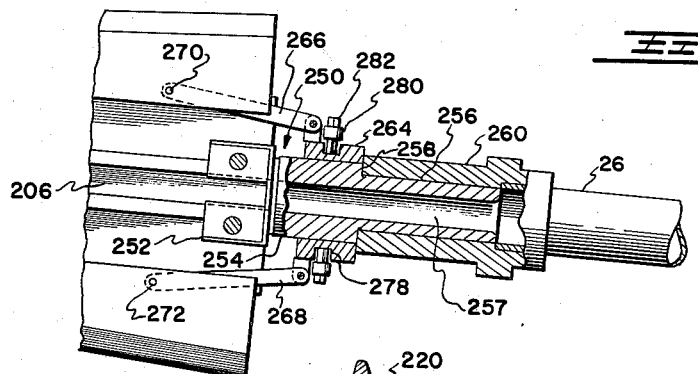
FIG. 10 is a fragmentary vertical elevation view, partially in section, of the welt end portion of the inspection form.
Figure 11:
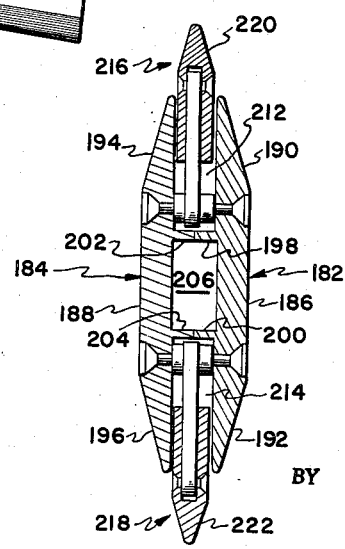
FIG. 11 is a view in transverse vertical section along line 11—11 of FIG. 7.

As shown in FIGS. 7–11, inclusive, an expansible inspection form generally indicated at 180 may be used with the hosiery turning and stacking machine 10, instead of the non-expansible form 20 shown in FIGS. 1–6, in connection with the inspection of full-fashioned or seamless hosiery. Expansible form 180 comprises side plates 182 and 184, respectively, which taper in lateral width from the welt end portion 183 to toe end 185 of the form. The outer surface of each of the side plates is flat in its central transverse portions 186 and 188 for substantially the entire length of each of the respective side plates. The side plates taper inwardly toward their outer edges as indicated at 190 and 192 on side plate 182 and at 194 and 196 on side plate 184. The side plate 182 is provided intermediate of its transverse width with a pair of spaced rib members 198 and 200 which extend longitudinally of the side plate from the toe end of the side plate to a point a short distance inwardly of the welt end portion 183 of the side plate. Similarly, side plate 184 is provided with a pair of spaced rib members 202 and 204 which extend longitudinally of the side plate for the same distance as the corresponding ribs of the bottom side plate. As will best be seen in FIG. 11, the inner ends of the ribs 198 and 200 of side plate 182 register in abutting relation to the inner ends of ribs 202 and 204 of side plate 184 when the two side plates are assembled with their respective inner faces in facing relation as shown in FIG. 11. The abutting relation of the respective ribs of the side plates serve to define a hosiery receiving passage 206 which extends from the toe end of the form to the termination of the ribs in the welt end portion of the form. The mating ribs 198, 202, 200 and 204 are provided with apertures 208 for receiving bolts or other suitable fastening means 210.

The inwardly projecting ribs 198, 200, 202 and 204 of the respective side plates 182 and 184, in addition to defining the hosiery receiving passage or channel 206, also define on opposite sides of hosiery receiving channel 206 a pair of longitudinally extending channels 212 and 214 which respectively receive laterally movable expander members generally indicated at 216 and 218, respectively. The expander members 216 and 218 are tapered along their longitudinal outer edges as indicated at 220 and 222, respectively, the inner portions of the respective expander members 216 and 218 being rectangular in cross-section and having a transverse width slightly less than the spacing between the facing inner surfaces of side plates 182 and 184 to permit easy sliding action of the expander members with respect to the side plates.

As will best be seen in FIG. 8, expander plate 216 is provided with internal grooves 224 and 226 adjacent its toe and welt end portions, respectively, for receiving the inner ends of pivotally connected links 228 and 230, respectively. The opposite end of link 228 is pivotally connected to the opposite side plates 182 and 184 adjacent ribs 198 and 202, the ribs being arcuately recessed as indicated at 232 adjacent the pivotal connection of link 228 to the side plates. Similarly, the inner end of link 230 is pivotally connected to side plates 182 and 184 adjacent ribs 198 and 202, the ribs being recessed as indicated at 234 adjacent the pivotal connection of link 230. In a similar manner, the expander member 218 is provided with internal grooves 236 and 238 adjacent its toe and welt end portions, respectively, for receiving the outer ends of link members 240 and 242, respectively. Each of the links 240 and 242 is pivotally connected to expander member 218 in the region of the grooves 236 and 238 and to side plates 182 and 184 adjacent ribs 200 and 204, the ribs being provided with arcuate recesses as indicated at 244 and 246 adjacent the pivotal connections of links 240 and 242 to the side plates.

The inspection form 180 is connected at its welt end portion to a spindle generally indicated at 250. Spindle 250 includes a generally rectangular-shaped end portion 252 which is rigidly attached between the side plates 182 and 184 at the welt end portions thereof beyond the termination of the ribs 198, 200, 202 and 204. Bolts or other suitable fastening means securely hold the end portion 252 of the spindle in assembled relation with respect to the side plates. Spindle 250 also includes a cylindrical sleeve portion 254 to which is connected a sleeve portion 256 of smaller diameter, a shoulder 258 being formed by the junction of sleeve portions 254 and 256. An axially extending passage 257 extends through the entire length of spindle 250. Passage 257 communicates with hosiery passage 206 of the inspection form. A coupling collar 260 surrounds the outer surface of sleeve portion 256 of the spindle, collar 260 extending beyond the end of the spindle to receive the end of duct section 26, which is connected to the source of suction.

A collar member 264 surrounds and is slidably movable axially along the outer periphery of sleeve section 254 of the spindle. Pivotally connected to sliding collar 264 are a pair of oppositely disposed drag links 266 and 268, the links 266 and 268 being pivotally connected at their opposite ends to the rear end portions of expander members 216 and 218 at points 270 and 272, respectively. The welt end portions of the respective expander members 216 and 218 are provided with triangular-shaped internal grooves 274 and 276, respectively, for receiving the ends of link members 266 and 268. Collar 264 is provided intermediate of its axial length with a circumferentially extending groove 278 to which the ends of a yoke member 280 are connected by means of inwardly extending studs 282. Studs 282 are slidably movable along groove 278 to permit the inspection form to be manually rotated by the operator during the inspection step.

As will best be seen in the view of FIG. 9, yoke member 280 is pivotally connected at 284 to a bracket member 286 connected to the stationary framework of the machine. A piston rod 288 is pivotally connected to yoke 280 at point 290 intermediate the length of the yoke, the opposite end of piston rod 288 being connected to a piston member movable in a fluid pressure cylinder 292. Conduits 294 and 296 are connected to a suitable control valve to admit and exhaust pressure fluid such as high pressure air to and from the opposite ends of the piston member connected to piston rod 288 to control the forward and reverse movements of the piston rod and hence to control the forward and reverse movements of yoke 280 about its pivotal axis 284.

When air pressure is admitted to cylinder 292 in a direction which causes yoke 280 to move in a clockwise direction with respect to the view shown in FIG. 9, or toward the toe end of the hosiery form, collar 264 is caused to slide forwardly on the outer surface of sleeve portion 254 to a position shown in FIG. 7 of the drawings. Forward movement of collar 264 imparts a forward movement to drag links 266 and 268, and thus an axially forward movement to expander members 216 and 218. Forward movement of expander members 216 and 218 causes connecting links 230, 242, 228 and 240 to pivot forwardly with respect to the view shown in FIG. 8 to thereby cause expander members 216 and 218 to move laterally inwardly to contract the inspection form. Thus, expander members 216 and 218 move axially forwardly toward the toe end of the form and also laterally inwardly upon the contraction of the form as just described.

When air is admitted to cylinder 292 through inlet line 294 in a direction to cause movement of yoke 280 and drag links 266 and 268 in a rearward direction to the position shown in FIGS. 8, 9 and 10, the expander members 216 and 218 are moved axially rearwardly. Connecting links 228, 230, 240 and 242 are caused to move rearwardly to move the expander members 216 and 218 laterally outwardly. This causes the stocking to be pulled tightly on the form, facilitating inspection of the toe end of the hosiery. Moreover, when the form is collapsed by the movement of drag links 266 and 268 in a forward direction, as previously described, expander elements 216 and 218 move forwardly, thereby causing a forward movement of the stocking. This facilitates the gripping of the stocking by the suction in hosiery receiving passage 206 of the form and causes the stocking to be drawn through passage 206 and thence through the passage 257 of spindle member 250. The hosiery then passes into the hosiery inlet tube 26 and thence into the nozzle housing 27 where it is engaged by the gripping elements 64 and 66 of the traversing housing 68.

The bagging attachment shown in FIGS. 12, 13 and 14 may be used with the hosiery turning and stacking apparatus hereinbefore described either with the non-expansible or the expansible inspection form. The machine shown in FIG. 12 includes a downwardly inclined trough-like member 310 supported by brackets 312 on the framework of the machine. Trough 310 is disposed beneath the traversing path of traversing housing 68 which, in FIG. 12, is shown in engagement with the nozzle housing 27 of suction duct 26. A microswitch 320 is attached to the forward end of the stationary framework where it is contacted by the traversing housing 68 at the completion of the forward movement of the traversing housing.

The forward end of trough 310 communicates with a vertically extending hollow chute member 322 which is disposed above a bag or other receptacle for receiving the hosiery. A conduit 324 connected to a suitable source of high-pressure air extends laterally outwardly from the stationary framework of the apparatus. A pair of branch conduits 326 and 328 are connected to conduit 324, the outlet openings of the respective branch conduits being directed downwardly toward the forward portion of trough 310 to direct air blasts against hosiery in trough 310 and cause the hosiery to be delivered to chute 322. A third branch conduit 330 is also connected to conduit 324 and is connected to the lower end of a vertical pipe member 332 which is hooked over the upper edge of vertical chute 322 in such manner that the outlet end 334 of pipe 332 is directed downwardly into the interior of chute 322. When traversing housing 314 actuates microswitch 320, a solenoid (not shown) is energized and opens a valve admitting high-pressure air to conduit 324 and thence to branch conduits 326, 328 and 330. The high-pressure air passing outwardly from conduits 326 and 328 blows the dropped hosiery downwardly along inclined trough 310 and into chute 322. The high-pressure air also passes through branch conduit 330, pipe 332 and through outlet 334 to discharge high-pressure air downwardly into the vertical chute 322 to blow the stocking downwardly through chute 322 into a receptacle or bag disposed beneath the chute.

*Electrical control circuit*

The electrical control circuit of the apparatus is shown in FIG. 15. In the embodiment shown, the electrical apparatus is connected to power lines 400 and 402 which are connected to a suitable source of A.C. power through a disconnect switch generally indicated at 404. Continuously operating motor 38 which drives the positive displacement suction pump 30 is connected to power lines 400 and 402 through conductors 406 and 408, respectively. Continuously operating motor 130 for the drive chain 114 is connected across power lines 400 and 402 by conductors 410 and 412, respectively.

A step-down transformer generally indicated at 414 is provided for supplying operating voltages for the magnetic operating coils of the various electrical relays used in the control circuit and includes a primary winding 416 which is connected to power lines 400 and 402 by means of conductors 418 and 420, respectively, and a secondary winding 422 having output terminals 424 and 426. A normally open relay generally indicated at 428 is provided for controlling electric clutch element 140. Relay 428 has a magnetic operating coil 430 connected across terminals 432 and 434, a normally open contact 436 movable to bridge terminals 438 and 440 of the relay when coil 430 is energized, and a normally open contact 442 movable to bridge terminals 444 and 446 when coil 430 is energized.

A normally closed relay 448 is provided for controlling electric brake 142. Relay 448 includes a magnetic operating coil 450 connected across terminals 452 and 454 and a normally closed contact 456 which normally bridges terminals 458 and 460 of the relay when operating coil 450 is not energized and which is movable to open position when coil 450 is energized.

A bridge rectifier generally indicated at 462 is provided, the input terminals 464 and 466 of the rectifier being connected to power lines 400 and 402 through conductors 468 and 470, respectively. Vacuum switch 42, which is operated to closed condition by the presence of hosiery in the nozzle housing 27 of duct section 26, is connected in such manner as to have its closing simultaneously cause the energization of normally open relay 428 and of normally closed relay 448, thereby starting the traversing cycle of traversing housing 68.

One side of vacuum switch 42 is connected to terminal 424 of transformer secondary winding 422 by means of conductor 472, junction 474 and conductor 476 which is connected to terminal 424 of winding 422. The other side of vacuum switch 42 is connected by means of conductor 478 to terminal 432 of operating coil 430 of normally open relay 428. Conductor 478 is also connected to terminal 452 of magnetic operating coil 450 of normally closed relay 448. Terminal 434 of magnetic operating coil 430 of relay 428 is connected by means of conductor 480 to terminal 426 of transformer secondary winding 422. Also, terminal 454 of magnetic operating coil 450 of normally closed relay 448 is connected by means of conductor 484, junction 434 and conductor 480 to terminal 426 of transformer secondary winding 422. Thus, closure of vacuum switch 42 by the presence of hosiery in the nozzle housing 27 of duct section 26 results in the energization of both magnetic operating coils 430 and 450 of normally open relay 428 and of normally closed relay 448, respectively.

Normally open contact 442 of relay 428 closes a sealing-in or holding circuit for magnetic operating coils 430 and 450 through cycle stop switch 156. One side of cycle stop switch 156 is connected by means of conductor 485, junction 486 and conductor 476 to terminal 424 of transformer secondary winding 422. The other side of cycle stop switch 156 is connected by conductor 487 to terminal 444 of relay 428. Hence, the closing of normally open contact 442 due to the energization of magnetic operating coil 430 when vacuum switch 42 is actuated establishes the following holding circuit for magnetic coil 430: from terminal 424 of transformer secondary winding 422, through conductor 476, junction 486, conductor 485, cycle stop switch 156, conductor 487, terminal 444, contact 442, terminal 446, conductor 478 to terminal 432 of coil 430. The other side of coil 430 is already connected to terminal 426 of secondary winding 422 through conductor 480. A holding circuit to coil 450 of relay 448 is also completed through cycle stop switch 156 and contact 442.

Terminal 438 of normally open relay 428 is connected by means of conductor 488 to one side of electric clutch element 140. The opposite side of electric clutch element 140 is connected by conductor 490, junction 492 and conductor 494, through a suitable fuse to the output terminal 496 of rectifier bridge 462. Terminal 440 of relay 428 is connected by conductor 498 to output terminal 500 of rectifier bridge 462. Thus, when contact 436 of relay 428 bridges terminals 438 and 440 of the relay due to energization of magnetic operating coil 430, electric clutch element 140 is connected across the output terminals 496 and 500 of rectifier bridge 462.

Terminal 458 of normally closed relay 448 is connected by means of conductor 502 to one side of electric brake 142, the other side of brake 142 being connected by means of conductor 504, junction 492 and conductor 494 to terminal 496 of rectifier bridge 462. Terminal 460 of normally closed relay 448 is connected by conductor 506, junction 508 and conductor 498 to output terminal 500 of rectifier bridge 462. Thus, when normally closed contact 456 of relay 448 is in its normally closed position, electric brake 142 is connected across the output terminals 496 and 500 of rectifier bridge 462.

In order that the operator may know when a predetermined batch of hosiery has been stacked, a counter switch 510 and a signal light 512 are provided. Switch 510 and signal light 512 are connected in series with each other across transformer secondary winding 422. Traversing housing 68 trips a counter lever connected to switch 510 on each forward traversing movement of the traversing housing. At the end of a predetermined number of cycles of operation, say twelve, for example, switch 510 is closed and energizes signal light 512 so that the operator will know that a predetermined quantity of hosiery has been stacked.

The cycle of operation of the apparatus will now be described.

Cycle of operation

The hosiery to be inspected is positioned on the non-expansible inspection form 20 or on the expansible inspection form 180, depending upon which form is installed on the machine being used. If the expansible form 180 is being used, the operator expands the form by actuating a suitable valve which admits high-pressure air through conduit 294 to cylinder 292 to thereby move piston rod 288 rearwardly of the inspection form as shown in FIGS. 9 and 10. This causes yoke 280 to pivot about pivot point 284 in a rearward direction, thereby sliding collar 264 along spindle 250 and causing drag links 266 and 268 to move rearwardly. Expander members 216 and 218 move rearwardly, thereby causing links 228, 230, 240 and 242 to swing outwardly in such manner as to move expander elements 216 and 218 laterally outwardly. This causes the stocking to be drawn up tightly on the form.

After the inspection operation is completed on the expansible form, the operator admits air pressure through inlet line 296 to cylinder 292 thereby causing yoke 280 to move forwardly and causing expander elements 216 and 218 to move forwardly toward the toe end of the form. At the same time, links 228, 230, 240 and 242 swing inwardly about their pivotal axes, causing expander members 216 and 218 to move laterally inwardly. The forward shifting of expander members 216 and 218 upon contraction of the form pushes the toe of the stocking forwardly and permits the suction applied through hosiery receiving passage 206 of the inspection form to draw the hosiery into passage 206 and thence through the passage of spindle 250 to U-shaped duct section 26, the hosiery passing through duct section 26 and into engagement with the open hosiery gripping jaws 64 and 66 in the nozzle housing 27 of duct section 26.

Figure 2:
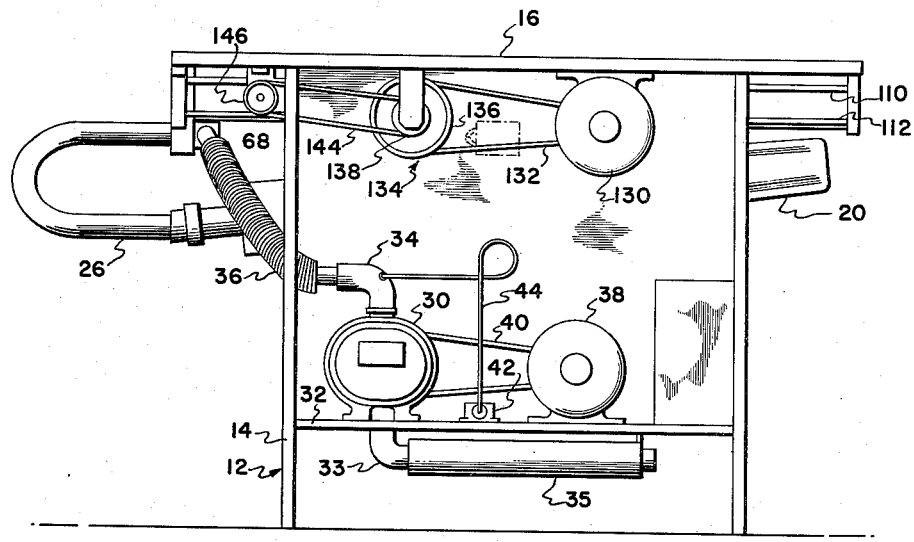
FIG. 2 is a rear elevation view of the apparatus of FIG. 1.

When the non-expansible hosiery inspection form 20 of FIGS. 1 and 2 is used, the operator releases the hosiery at the end of the inspection step, thereby permitting the suction within the interior passage 22 of the inspection form to draw the hosiery into passage 22 and thence through duct sections 24 and 26 into engagement with clamping jaws 64 and 66.

As the hosiery is drawn into either the passage 22 of inspection form 20 or the passage 206 of inspection form 180, the hosiery is turned right-side-out.

The presence of the hosiery in the nozzle housing 27 causes an increase in the vacuum present in the inlet line 34 of vacuum pump 30. This causes vacuum switch 42 to close. Closing of vacuum switch 42 energizes operating coil 430 of normally open relay 428 through the following circuit: from terminal 424 of transformer secondary winding 422, through conductor 476, junction 474, conductor 472, vacuum switch 42, conductor 478, terminal 432, magnetic operating coil 430, terminal 434, conductor 480 to terminal 426 of transformer secondary winding 422. Relay coil 430 is thereby energized and closes normally open contacts 436 and 442. Closure of contact 442 completes a holding circuit for relay coil 430 in the following manner: from terminal 424 of transformer secondary winding 422, conductor 476, junction 486, conductor 485, cycle stop switch 156, conductor 487, terminal 444, contact 442, terminal 446, conductor 478 to terminal 432 of magnetic operating coil 430, terminal 434, conductor 480 to terminal 426 of transformer secondary winding 422.

Closure of normally open contact 436 of relay 428 results in the energization of electric clutch element 140 through the following circuit: from terminal 500 of rectifier bridge 462, through conductor 498 to terminal 440 of relay 428, contact 436, terminal 438, conductor 488, clutch element 140, conductor 490, junction 492, conductor 494 to terminal 496 of rectifier bridge 462. Clutch element 140 is thereby energized.

The closing of vacuum switch 42 by the presence of hosiery at nozzle housing 27 also energizes the magnetic operating coil 450 of normally closed relay 448 through the following circuit: from terminal 124 of transformer winding 422, through conductor 476, junction 474, conductor 472, vacuum switch 42, conductor 478, terminal 452, magnetic operating coil 450, terminal 454, conductor 484, junction 434, conductor 480 to terminal 426 of transformer secondary winding 422. Magnetic operating coil 450 of relay 448 is thereby energized to open normally closed contact 456 to thereby de-energize the circuit of electric brake 142 simultaneously with the energization of electric clutch element 140. The same holding circuit through cycle stop switch 156 which holds relay 428 energized also holds relay 448 energized until the cycle stop switch 156 opens at the end of the traversing cycle of traversing housing 68.

The simultaneous energization of electric clutch element 140 and the de-energization of electric brake 142 permits power to be transmitted from continuously operating drive motor 130 through drive belt 132, clutch pulleys 136 and 138, drive belt 144 to pulley 146 and thence to the drive sprocket 116 for drive chain 114. The movement of drive chain 114 causes traversing housing 68 to be moved to the left with respect to the view shown in FIG. 3 and out of engagement with nozzle housing 27. As soon as traversing housing 68 moves out of engagement with the nozzle housing 27, slidable rod 96 carried by the traversing housing moves out of engagement with stop member 100 and permits spring 86 to move bell crank 74 in a counterclockwise direction with respect to the view shown in FIG. 3, thereby causing hosiery gripping jaws 64 and 66 to grip the hosiery. As traversing head 68 moves away from nozzle housing 27, the hosiery is drawn from duct section 26 in longitudinally outstretched relation, the toe of the hosiery being gripped by gripping jaws 64 and 66.

As traversing head 68 approaches the limit of its movement in a forward direction, or to the left with respect to the view shown in FIGS. 1 and 4, projection 84 at the outer end of bell crank 74 engages cam 150 which is located adjacent the end of the forward movement of the traversing housing. The engagement of projection 84 with cam 150 causes the bell crank to be swung in a clockwise direction about its pivotal axis with respect to the views shown in the drawings, to thereby cause gripping jaws 64 and 66 to move to open position. The toe of the hosiery is thereby released from the gripping jaws and the hosiery drops downwardly into the receiving tray or receptacle disposed beneath the path of traversing movement of traversing head 68.

If the apparatus is equipped with the bagging attachment shown in FIGS. 12, 13 and 14, traversing housing 68 engages microswitch 320 at the end of the forward path of movement, causing opening of a valve in high-pressure air inlet conduit 324. This causes air to pass through branch conduits 326, 328 and 330. The stocking which has been dropped by the hosiery gripping elements into trough 310 is blown by high-pressure air from conduits 326 and 328 downwardly along the inclined interior surface of trough 310 and into the vertical chute 322. High-pressure air which passes through branch conduit 330 and into pipe 332 is blown from outlet 334 of pipe 332 vertically downwardly into chute 322 to cause hosiery passing into the chute to be discharged into a bag or receptacle disposed beneath chute 322.

After traversing housing 68 has completed its forward movement and the hosiery has been released by gripping jaws 64 and 66, drive chain 114 returns the traversing head along the return path and once again into engagement with nozzle housing 27 of duct section 26. As the traversing housing moves into engagement with the nozzle housing, slidable rod 96 engages stop member 100 and causes bell crank 74 to be pivoted in a clockwise direction with respect to the view shown in FIG. 3 to thereby cause the gripping jaws 64 and 66 to move to the open position shown in FIG. 3 in readiness for another cycle of operation.

As traversing housing 68 reaches the end of the return path and again engages nozzle housing 27, cycle stop switch 156 is engaged by crosshead 104 which supports traversing housing 68, thereby moving cycle stop switch 156 to open position. Opening of cycle stop switch 156 opens the holding circuit of control relays 428 and 448. This results in the de-energization of magnetic operating coil 430 of relay 428 and also in the de-energization of operating coil 450 of relay 448. The de-energization of operating coil 430 results in the opening of contacts 442 and 436. The opening of contact 436 de-energizes electric clutch element 140, thereby removing drive motor 130 from driving relation with respect to chain 114. The opening of contact 442 further opens the holding circuit for operating coils 430 and 450.

The de-energization of operating coil 450 of normally closed relay 448 permits normally closed contact 456 to reclose to complete the energization circuit of electric brake 142. Brake 142 acts on pulley member 138 to prevent further rotation of chain 114. Due to the combined effects of the de-energization of the electric clutch element 140 and the re-energization of electric brake 142, traversing housing 68 remains in engagement with nozzle housing 27 in readiness for another cycle of operation, to be initiated by the presence of another stocking at the nozzle housing.

It can be seen from the foregoing that there is provided in accordance with this invention a hosiery turning and stacking machine which is simple in construction and operation, and which automatically removes the hosiery from an inspection form, turns the hosiery, and deposits the hosiery in stacked position along a path adjacent the inspection form. The hosiery gripping elements which mechanically grip and transfer the turned hosiery to stacked position cooperate with the pneumatic turning means to provide a reliable and efficient apparatus.

Furthermore, the expansible hosiery form disclosed as a further feature of the invention facilitates the inspection step and cooperates with the pneumatic hosiery turning means to facilitate turning of the hosiery. The combined axial and lateral movement of the expander members of the expansible form aids in proper positioning and removal of the hosiery from the form. The bagging attachment disclosed in the application as a further feature of the invention simplifies the problem of bagging the stacked hosiery, where bagging is desired.

While there have been shown and described particular embodiments of the invention, it will be apparent to those skilled in the art that various changes and modifications may be made therein without departing from the invention, and, therefore, it is aimed to cover all such changes and modifications as fall within the true spirit and scope of the invention.

What I claim as my invention is:

1. A hosiery transfer apparatus comprising a reciprocably movable traversing means for transferring hosiery along a predetermined path and for releasing the hosiery at the end of a predetermined movement along said path, an upwardly open receiving means disposed along said path for receiving hosiery released by said traversing means, and means for applying a pneumatic pressure differential to hosiery received by said receiving means to cause the hosiery to move along said receiving means to a predetermined discharge point.

2. A hosiery transfer apparatus comprising a reciprocably movable traversing means for transferring hosiery along a predetermined path and for releasing the hosiery at the end of a predetermined movement along said path, an upwardly open and downwardly inclined receiving means disposed along said path for receiving hosiery released by said traversing means, a vertical discharge chute communicating with the lower end of said downwardly inclined receiving means, and means for applying a pneumatic pressure differential to hosiery received by said receiving means to cause the hosiery to move along said receiving means and into said chute.

3. A hosiery transfer attachment for use with a hosiery stacking apparatus of the type in which hosiery is released by a transfer means at the end of a predetermined movement of said transfer means, comprising an upwardly open receiving means disposed along the path of said transfer means for receiving hosiery released by said transfer means, a vertical discharge chute communicating with the end of said receiving means, and means for applying a pneumatic pressure differential to hosiery received by said receiving means to cause the hosiery to move along said receiving means and into said chute.

4. A hosiery turning and stacking apparatus comprising a hosiery form having a hosiery receiving passage extending therethrough, means for applying a pneumatic pressure differential to the interior of said passage for causing hosiery on the form to pass through said passage, hosiery gripping means disposed behind said form adjacent an outlet of said passage, traversing means for moving said gripping means from said outlet along a path behind said form to extend the hosiery along said path, and means for causing said gripping means to grip hosiery at said outlet and release the hosiery at the end of said path.

5. A hosiery turning and stacking apparatus comprising a hosiery form having a hosiery receiving passage extending therethrough, means for applying a pneumatic pressure differential to the interior of said passage whereby hosiery is caused to pass through said passage, hosiery gripping means disposed behind said form adjacent an outlet of said passage, traversing means for moving said gripping means along a path behind said form to extend the hosiery along said path, and cam means adjacent said outlet for causing said gripping means to grip said hosiery as said traversing means moves said gripping means away from said outlet and positioned at the end of said path for causing said gripping means to release said hosiery after it is withdrawn from said passage.

6. A hosiery turning and stacking apparatus comprising a hosiery form having a hosiery receiving passage extending therethrough, means for applying a pneumatic pressure differential to the interior of said passage for causing hosiery on the form to pass through said passage, hosiery gripping means disposed adjacent an outlet of said passage, and traversing means actuatable by the presence of hosiery at said outlet for moving said gripping means along a path extending from said outlet to withdraw the hosiery and deposit it along said path.

7. A hosiery turning and stacking apparatus comprising a hosiery form having a hosiery receiving passage extending therethrough, means for applying a pneumatic pressure differential to the interior of said passage for causing hosiery on the form to pass through said passage, hosiery gripping means disposed adjacent an outlet of said passage behind said form, a hosiery stacking surface behind and below said form, traversing means for moving said gripping means along a path from said outlet over said stacking surface, and means for causing said gripping means to grip hosiery upon movement of said gripping means away from said outlet and to release the hosiery to drop on said surface.

8. A hosiery turning and stacking apparatus comprising a hosiery form having a hosiery receiving passage extending therethrough, means for applying a pneumatic pressure differential to the interior of said passage to strip hosiery from the form and convey it through said passage, hosiery gripping means disposed adjacent an outlet of said passage for gripping the hosiery stripped from the form, traversing means for translating said gripping means along a path behind said form from said outlet to withdraw hosiery from the passage and extend it along the path, and means actuatable by the presence of hosiery in said passage adjacent said outlet for operating said gripping means to grip the hosiery and said translating means to extend the hosiery along said path.

9. A hosiery turning and stacking apparatus comprising a hosiery form having a hosiery receiving passage extending therethrough, means for applying a vacuum to the interior of said passage to strip hosiery from the form and convey it through said passage, hosiery gripping means disposed adjacent an outlet of said passage for gripping the toe of hosiery stripped from the form, traversing means for translating said gripping means along a path from said outlet to withdraw hosiery from the passage and extend it along the path, means responsive to the presence of hosiery in said passage adjacent said outlet for operating said traversing means to move said gripping means along said path, and cam means disposed adjacent said outlet for actuating said gripping means to grip the hosiery as said traversing means moves said gripping means away from said outlet and to release said gripping means when said traversing means reaches the end of said path.

10. A hosiery turning and stacking apparatus comprising a hosiery form having a hosiery receiving passage extending therethrough, a hosiery delivery passage connected to the passage at one end of said form and extending behind said form, an outlet in said delivery passage behind said form, hosiery gripping means behind said form disposed adjacent said outlet for gripping the toe of hosiery stripped from said form and delivered by said vacuum through said passages, a stacking surface disposed behind and below said form, traversing means for translating said gripping means along a path behind said form from said outlet over said stacking surface to withdraw hosiery from said passage and extend it over said surface, and means actuatable by the presence of hosiery in said delivery passage adjacent said outlet for operating said traversing means to move said gripping means along said path and cause said gripping means to deposit hosiery on said stacking surface.

11. A hosiery turning and stacking apparatus comprising a hosiery form having a hosiery receiving passage extending therethrough, a hosiery delivery passage connected to said receiving passage at one end of said form and extending behind said form, means for applying a vacuum to the interior of said passages to strip hosiery from said form and convey it through said passages, hosiery gripping means disposed behind said form adjacent an outlet of said delivery passage for gripping the toe of hosiery stripped from the form, a stacking surface disposed behind said form, traversing means for translating said gripping means along a path behind said form from said outlet to withdraw hosiery from the passage and extend it over said stacking surface, cam means adjacent said outlet for actuating said gripping means upon movement of said traversing means away from said outlet to cause said gripping means to grip hosiery at said outlet, cam means at the end of said path actuated by movement of said gripping means along said path for releasing said gripping means from said hosiery to deposit the hosiery on said stacking surface, and means responsive to the presence of hosiery in said delivery passage adjacent said outlet for operating said traversing means to move said gripping means along said path and extend and deposit the hosiery on said surface.

References Cited in the file of this patent

UNITED STATES PATENTS

| | | |
|---|---|---|
| 964,959 | Ermentrout | July 19, 1910 |
| 2,345,967 | Gent | Apr. 4, 1944 |
| 2,363,380 | Ammon | Nov. 21, 1944 |
| 2,601,229 | Shoaf et al. | June 24, 1952 |
| 2,624,641 | Smith | Jan. 6, 1953 |
| 2,684,187 | Kienel | July 20, 1954 |